United States Patent
Ge

(10) Patent No.: US 9,719,467 B2
(45) Date of Patent: Aug. 1, 2017

(54) WASTEGATE POSITION SENSOR FOR WASTEGATE AND ENGINE PRESSURE SENSOR DIAGNOSTICS

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 405 days.

(21) Appl. No.: 14/577,695

(22) Filed: Dec. 19, 2014

(65) Prior Publication Data

US 2016/0178470 A1    Jun. 23, 2016

(51) Int. Cl.
  *G01L 27/00* (2006.01)
  *F02M 25/07* (2006.01)
  *G01M 15/10* (2006.01)

(52) U.S. Cl.
  CPC ...... *F02M 25/0753* (2013.01); *G01M 15/106* (2013.01)

(58) Field of Classification Search
  None
  See application file for complete search history.

(56) References Cited

U.S. PATENT DOCUMENTS

| | | |
|---|---|---|
| 4,213,181 A | 7/1980 | Carp et al. |
| 6,192,321 B1 | 2/2001 | Grumstrup et al. |
| 6,435,169 B1 | 8/2002 | Vogt |
| 7,039,537 B2 | 5/2006 | Junk |
| 8,485,498 B2 | 7/2013 | Takeda et al. |
| 8,803,514 B2 | 8/2014 | Newman et al. |
| 2003/0182049 A1* | 9/2003 | Bale ............... F02M 26/48 701/108 |
| 2011/0113775 A1 | 5/2011 | Lilly |
| 2013/0340428 A1 | 12/2013 | Graichen et al. |
| 2014/0096675 A1 | 4/2014 | Fletcher et al. |
| 2015/0122234 A1* | 5/2015 | Tanaka ............ F02B 37/18 123/564 |

FOREIGN PATENT DOCUMENTS

DE    102007062099 A1    6/2009

* cited by examiner

*Primary Examiner* — Robert R Raevis
(74) *Attorney, Agent, or Firm* — Miller, Matthias & Hull

(57) ABSTRACT

An engine pressure sensor monitoring system uses the position of a wastegate in a turbo-charged engine when known and calibrated engine operating conditions occur to provide diagnostic information for various engine pressure sensors and for the operation of the wastegate itself. Discrete measurement windows are defined for engine conditions with specific values for parameters that may include rpm, torque, injection timing and fuel consumption. Other sensor readings for intake manifold pressure, turbocharger compressor output pressure, peak cylinder pressure, and wastegate valve position during these measurement windows should match predicted values. If measured and predicted values do not match, one or more sensors may be bad and an alarm may be raised.

20 Claims, 6 Drawing Sheets

US 9,719,467 B2

WASTEGATE POSITION SENSOR FOR WASTEGATE AND ENGINE PRESSURE SENSOR DIAGNOSTICS

TECHNICAL FIELD

The present disclosure relates to engine diagnostics and more particularly to the use of a wastegate position sensor for determining the correct function of the wastegate and for diagnosing failures in engine pressure sensors.

BACKGROUND

Modern diesel engines are often equipped with multiple pressure sensors and one or more turbochargers. Pressure sensors send ambient pressure, intake manifold pressure and other important pressure readings to an engine Electronic Control Module (ECM). These pressure readings are inputs for many engine control algorithms. When one of the pressure sensors stops measuring correctly, a diagnostic method has to detect the malfunction immediately in order to avoid engine system failure. While it is easy for a diagnostic algorithm to detect a difference among pressure sensors, it is a challenging task to accurately identify which pressure sensor is faulty, particularly when there are only two correlated sensors or all pressure sensors show a small deviation from a nominal value. An additional reference sensor added as a redundant sensor allows voting but increases engine cost and introduces another point of failure.

US Publication 20080066522 (the '522 publication) to Thiel discloses a method for determining the operability of a pressure sensor. The '522 publication utilizes a reference pressure sensor that is not an operating element of the internal combustion engine to provide a reference ambient pressure. All engine onboard sensors read ambient pressure values and compare to the reference ambient pressure value determined by the reference pressure sensor.

The '522 publication assumes that the reference pressure sensor itself is working perfectly and the reference pressure is calibrated by external pressure calibration system. The reference pressure sensor does not provide useful input for the ECM control algorithm and when engine operates correctly, the reference pressure sensor is redundant. In order to ensure correct operation of the reference pressure sensor, frequent calibration has to be performed. It is costly and time consuming to calibrate any pressure sensor as the calibration requires a special environment including pressure gauges.

SUMMARY OF THE DISCLOSURE

In one aspect of the disclosure a method of performing sensor diagnostics in an engine includes defining a measurement window for performing sensor diagnostics, the measurement window occurring when a plurality of engine conditions fall within respective value ranges. The method may include identifying a measurement window during operation of the engine, collecting wastegate position data and sensor data within the measurement window, and performing a diagnostic test using the sensor data collected within the measurement window. The diagnostic test includes determining a predicted output value for a first sensor as a function of wastegate position and comparing an actual value of the first sensor taken during the measurement window and the predicted output value. When the predicted output value and the actual value fail to meet a matching criterion, setting an alert indicating a probably failure in the first sensor.

In another aspect of the disclosure, a system for performing a sensor diagnostic test in an engine includes a wastegate having a wastegate position sensor that reports a displacement of the wastegate, a sensor being evaluated by the sensor diagnostic test, where the sensor configured to report a value of an engine parameter. The system also includes an engine controller coupled to the engine, the sensor, and the wastegate position sensor. The engine controller executes stored instructions that cause the engine controller to perform the sensor diagnostic test. The test includes analyzing at least the displacement of the wastegate to determine a predicted output value of the sensor and setting an alert indicating a failure in the sensor when the predicted output value of the sensor is outside a predetermined range of the value reported by the sensor.

In yet another aspect of the disclosure, a method of performing a sensor diagnostic test for an engine includes collecting data from a plurality of sensors including a wastegate position sensor that reports a position of a wastegate, determining a measurement window by analyzing the collected data, and analyzing the collected data read during the measurement window to develop a predicted value of a first sensor based at least in part on the wastegate position. The method concludes setting an alert for a failure of the first sensor when the predicted value of the first sensor and an actual value reported by the first sensor fail to meet a matching criterion.

DETAILED DESCRIPTION

A wastegate valve (or simply wastegate) is typically used to control the top speed of a turbocharger and peak cylinder pressure. When boost pressure approaches some predetermined maximum, the wastegate may open to channel exhaust directly from an exhaust manifold to a tailpipe. The wastegate may accumulate a build-up of hydrocarbons, soot and other compounds that inhibit proper operation due to the high temperature of the exhaust and the emission constituents in the engine exhaust. The result is that in sometimes the wastegate can stick closed and other times the wastegate may not close tightly, resulting in unexpected leakage.

There are other technical challenges in determining whether the wastegate is operating correctly. While the most straightforward way to monitor wastegate performance is to measure the exhaust manifold pressure when the wastegate opens, the temperature of the exhaust can reach 700 degrees C. under certain operation conditions. Typical pressure sensors may fail in as little as 70-100 hours, so direct measurement of pressure has its shortcomings. A further challenge is that manufacturing tolerance has to be taken into consideration when an algorithm decides whether a wastegate is closed tightly with no leakage. Additionally, when the wastegate is operating in the engine, the pulsating flow of engine exhaust can cause the wastegate performance profile to be different compared to the profile generated at end-of-line or bench tests using a static pressure source.

Figure 1:
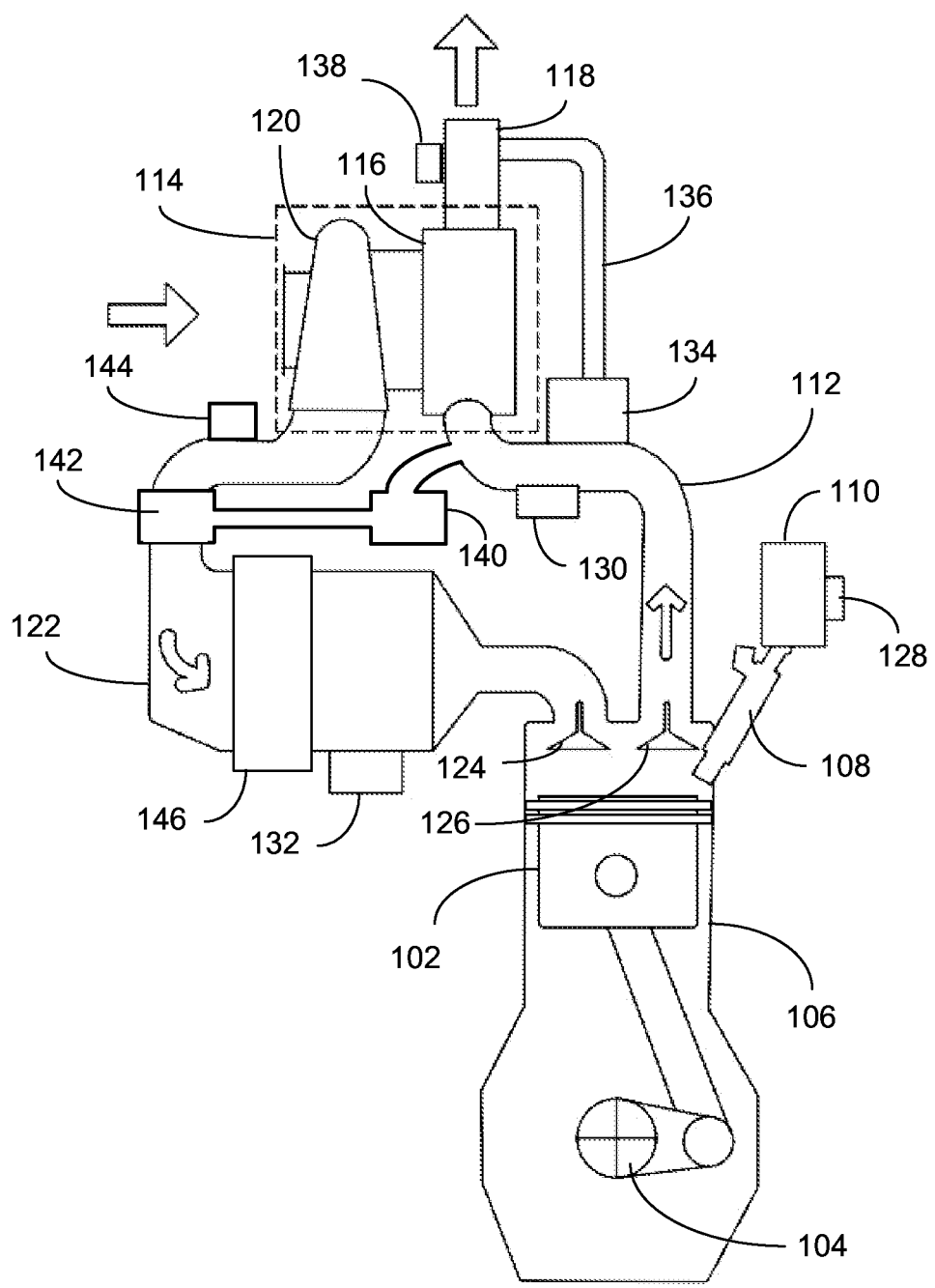
FIG. 1 is a partial cut away view of an engine.

FIG. 1 is a representative view of an engine 100, such as a diesel engine that may be used in any mobile or fixed application, including, but not limited to, on-road and off-road trucks; construction, mining, or forestry vehicles; and generators or pumps. The engine 100 may include a piston 102, a crankshaft 104, and a cylinder 106. A fuel injector 108 may be fed by a fuel rail 110. An exhaust manifold 112 may direct exhaust gas under pressure to a turbocharger 114 that includes a turbine 116 powered by the exhaust gas which exits to a tailpipe 118.

The turbocharger 114 may also include a compressor 120 that forces intake air into an intake manifold 122. The pressurized intake air is delivered into the cylinder when an intake valve 124 is opened. After a combustion cycle, the exhaust gas is pushed into the exhaust manifold 112 when the exhaust valve 126 is opened. An exhaust gas recirculation (EGR) valve 140 may selectively return exhaust gas to the intake manifold 122 via a mixer 142. A heat exchanger 146 may cool the intake air and exhaust gas mixture. A compressor outlet pressure sensor 144 provides a value for pressure at the outlet of the compressor 120. The EGR valve 140 has two pressure sensors associated with it. A delta pressure sensor (not depicted) provides a pressure across the EGR valve 140 and an EGR absolute pressure sensor (not depicted) provides a value of pressure at the EGR valve 140. Both the delta pressure sensor and the EGR pressure sensor are exposed to high temperatures and pre-catalytic converter compounds that may affect their reliability.

The same general components exist in a gasoline or alternate fuel engine, e.g., propane or liquid natural gas, with the addition of a spark plug in the cylinder and associated spark circuitry. The engine 100 may include a controller discussed more below that manages fuel delivery and valve timing, among other things, responsive to various sensor readings. Those sensors may include a fuel pressure sensor 128, an exhaust manifold pressure sensor 130, and an intake manifold air pressure (IMAP) sensor 132. A wastegate 134 is discussed more below, but briefly, opens when the exhaust manifold pressure is too high and allows exhaust gas to vent to the tailpipe 118 via a bypass line 136. A turbine output pressure sensor 138 provides a pressure of the exhaust gas at the output of the turbocharger 114. The electrical connections to the sensors are not shown for sake of simplicity.

Engines may have different numbers of cylinders but many engines large enough to use a turbocharger 114 use an even number of cylinders from 4 up to 16 or sometimes more.

Figure 2:
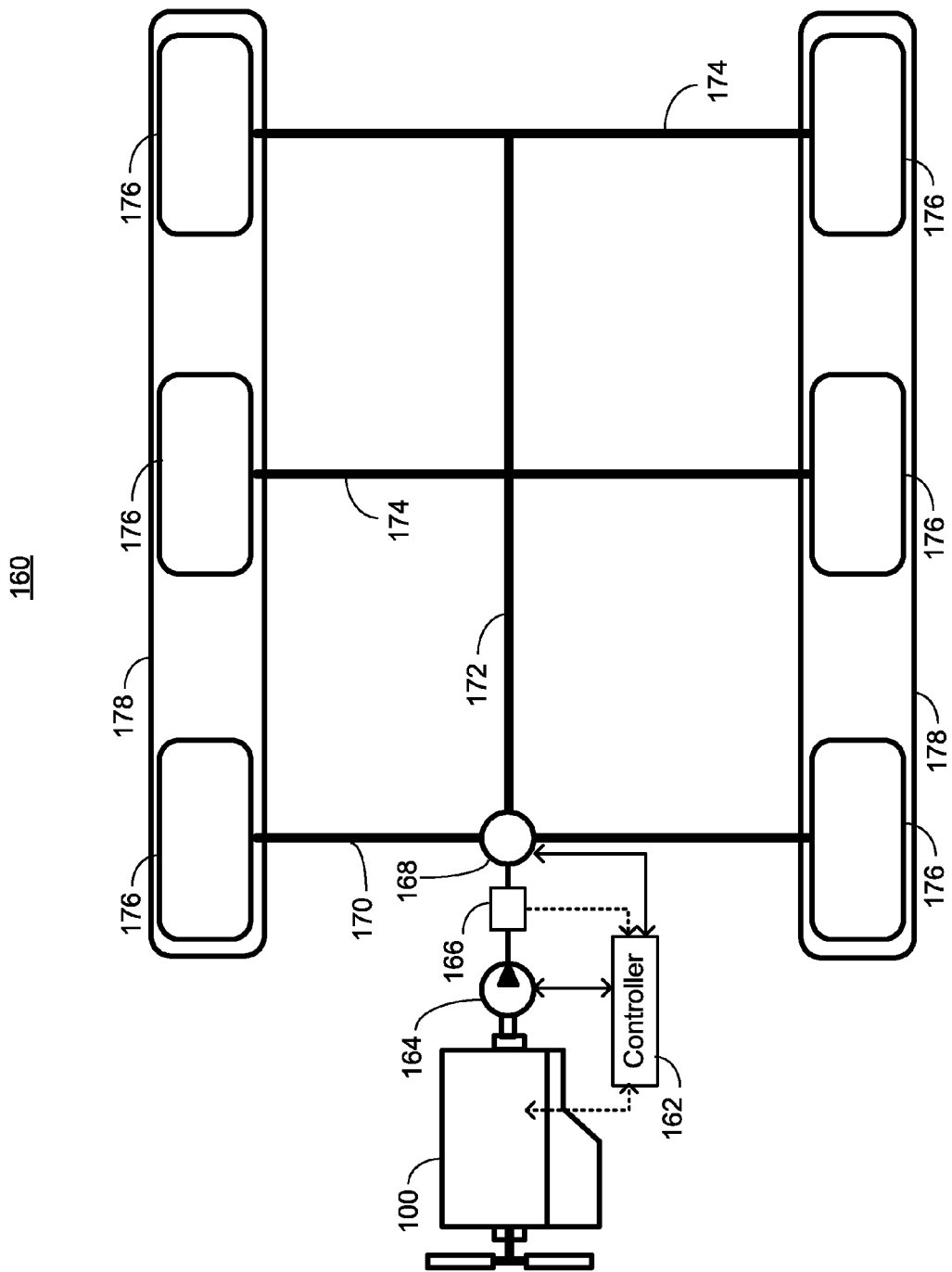
FIG. 2 is a block diagram of a machine incorporating the engine of FIG. 1.

FIG. 2 is illustrates the engine 100 in an exemplary embodiment of a machine 160, in this case a track-type tractor. The machine 160 may include an engine controller 162 that monitors inputs related to operation of the machine 160 and sets engine operating data such as a fuel injection timing and injected fuel quantity. The engine 100 in various embodiments may be coupled to a torque converter 164 and a transmission 168. A driveshaft sensor 166, coupled with data about the torque converter 164 may be used to determine a speed of the engine in revolutions per minute (rpm). The transmission 168 may drive an axle 170 and/or a drive shaft 172 that in turn powers one or more additional drive shafts 174. Wheels 176 may move a continuous track 178 to propel the machine 160.

Figure 3:
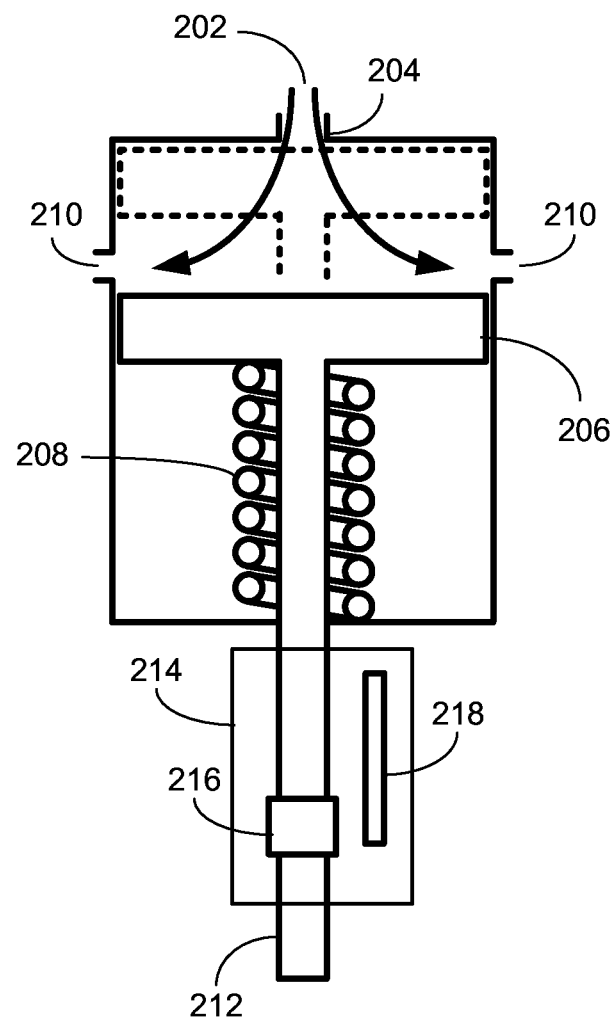
FIG. 3 is a cut away view of a wastegate.

Turning to FIG. 3, wastegate valves may be pneumatically actuated or may be an electrically or mechanically controlled butterfly valve. FIG. 3 is a cutaway view of a pneumatic implementation of an exemplary wastegate 134. The wastegate 134 operates a piston 206 under pneumatic pressure of the exhaust gas 202 in the manifold 112 that enters via the port 204 against the bias of a spring 208. When the wastegate 134 is at least partially open, the exhaust gas 202 exits ports 210 bypassing the turbocharger 114. This lowers the pressure in the exhaust manifold 112 which lowers the speed of the turbine 116 and compressor 120 in the turbocharger 114. Correspondingly, this lowers the pressure in the intake manifold 122. Exhaust gas pressure below a certain level will not move the piston 206 far enough to open ports 210. Higher pressures, including pressure spikes, can move the piston 206 so that the ports 210 move from being partially open to fully open.

In this exemplary embodiment, a shaft 212 is coupled to the piston 206 and moves in unison with the piston 206. The displacement of the shaft 212 and correspondingly, displacement of the piston 206 can be sensed using a position sensor 214. In an exemplary embodiment, the position sensor 214 may be a Hall effect sensor that includes a magnet 216 and a pickup 218, for instance, a coil of wire. An output (not depicted) of the position sensor 214 is connected to the controller 162 for use in interpreting engine conditions as discussed more below. Other position sensors may be used instead of a Hall effect sensor, such as magnetoresistance sensors. In an alternate embodiment, a butterfly type wastegate (not depicted) may use a Hall effect sensor on the valve or a shaft to sense rotational movement in the valve.

An advantage of the position sensor 214 for wastegate position sensing is that the sensor 214 is separated from the hot gas of the exhaust manifold. In this much more benign environment, lower cost sensors may be used which may also be expected to last much longer than pressure sensors that are exposed to the high temperatures and pre-catalytic converter chemical compounds of the exhaust gas.

An additional advantage of the piston or butterfly embodiments is that calibration of the position sensor 214 is a relatively simple operation that can be done in the field by simply observing the piston position and making adjustments with a hand tool. The closed position can be observed any time the engine 100 is off. If the travel of the piston 206 needs calibration, a simple hand pump can be used to supply air pressure to operate the wastegate 134. In contrast, an exhaust manifold pressure sensor 130 is calibrated with the engine operating and requires specialized pressure gauges, usually requiring a trip to a maintenance facility.

Lastly, Hall effect sensors are by nature durable because the operating elements of the sensor are not in physical contact and the moving part is a simple magnet with no electrical connections.

Figure 4:
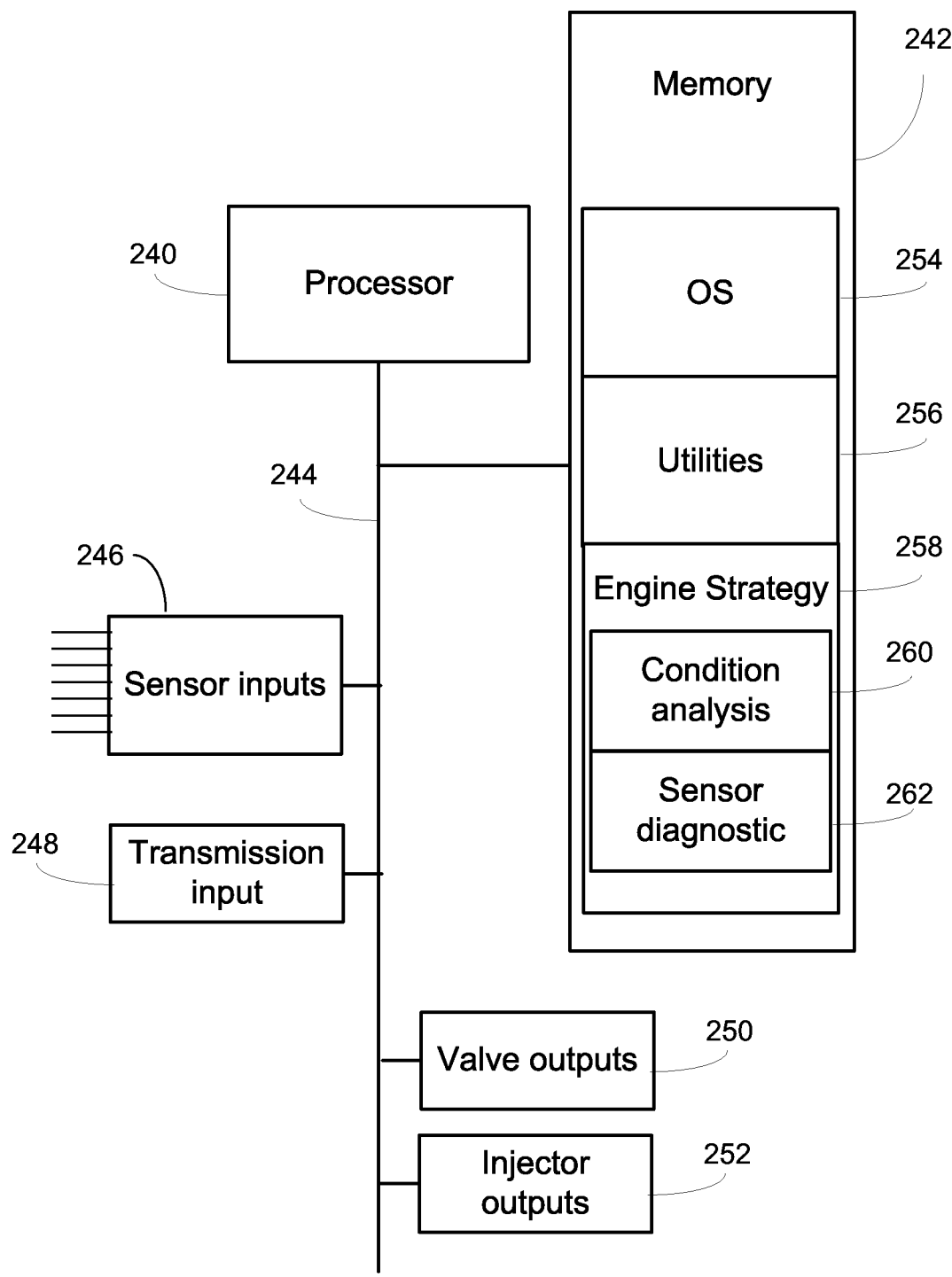
FIG. 4 is a block diagram of an engine controller.

FIG. 4 is a highly simplified block diagram of an exemplary engine controller 162. The controller 162 may include a processor 240 coupled to a memory 242 via a bus 244. Also coupled to the bus 244 may be a sensor input block 246 and a transmission input 248. The sensor input block 246 may include analog and/or digital input couplings depending on the type of output a particular sensor provides. The sensors discussed above as well as other emissions, drivetrain, and body electronics sensors may be coupled at the sensor input block 246.

Also coupled to the data bus 244 may be output operated under the control of an engine strategy 258 executed by the processor 240. The engine strategy may cause various outputs to be triggered, including valve outputs 250 that cause the intake and exhaust valves to be opened and closed, and injector outputs 252 that cause the fuel injectors to open, providing fuel to the cylinder 106. More complex engine strategies may use a multiple step fuel injection process using a pilot injection of a small amount of fuel prior to the main injection of fuel (shot mode 2).

The memory 242 may be any of several physical memories, including without limitations combinations of volatile and non-volatile RAM, ROM, flash, PROM, EEPROM or other memory technologies and constructions. The memory 242 is a physical memory and does not include carrier wave or other propagated media transient memories.

The memory 242 may include an operating system 254 and utilities 256 that manage the interactions of the processor 240 for internal and external communication, memory access, programming and diagnostics. The engine strategy 258 may include a first module 260 that includes condition analysis based on values of engine parameters received from sensors via the sensor input block 246 and engine operating data developed in the engine controller 162 itself.

For example, the exhaust manifold pressure sensor 130, turbine output pressure sensor 138, and input manifold pressure sensor 132 may all report values via the sensor input block 246. Other inputs like engine rpm, throttle angle, and throttle angle rate, vehicle slope, etc. may be combined with the pressure sensor readings so that the engine strategy 258 may determine the valve timing, injector timing and fuel quantity for the next cylinder cycle.

The sensor diagnostics module 262 may be used as described below to evaluate and diagnose errors in a number of individual pressure sensors as well as to monitor the operation of the wastegate.

INDUSTRIAL APPLICABILITY

Figure 5:
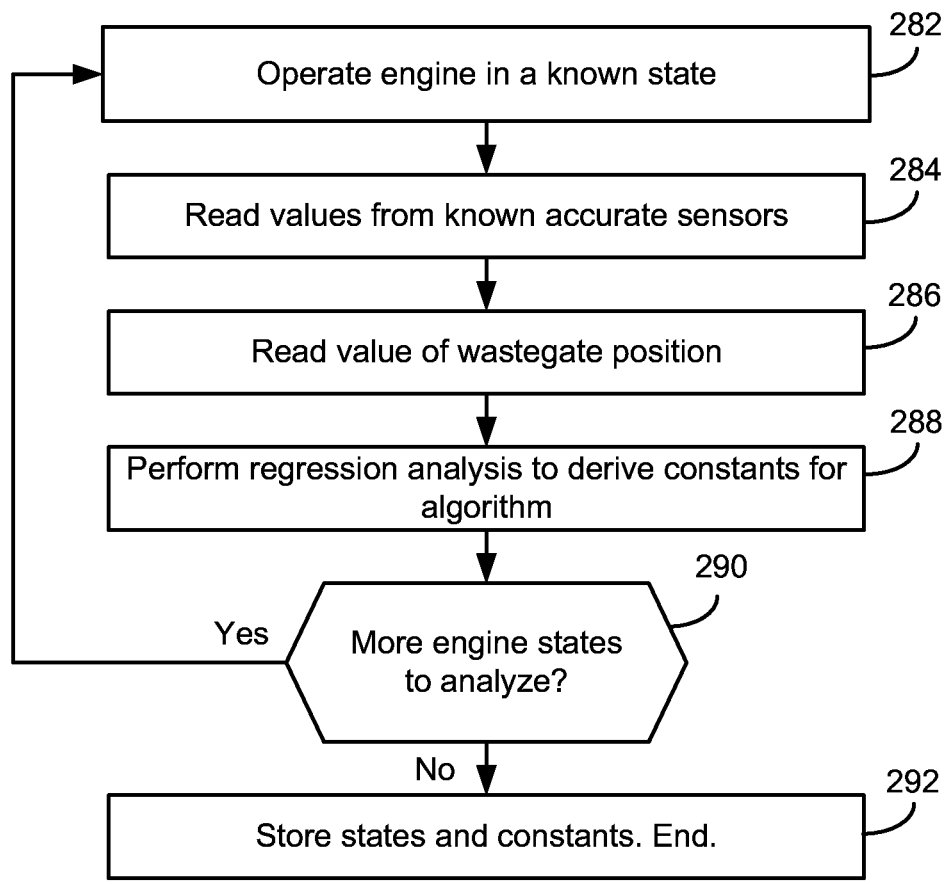
FIG. 5 is a flow chart of a method of characterizing sensors.

FIG. 5 is a flow chart of a method 280 of developing a regression model for engine sensor value estimation as a function of wastegate position during an engine calibration process. The characteristics of an engine are consistent for a given set of conditions. For example, at steady state engine operating conditions, engine rpm, fuel flow/load, and engine ECM calibration parameters (e.g. fuel injection mode, injection timing and injection pressure) are essentially constants, and other traits of the engine 100 will repeat, such as exhaust manifold pressure, turbine compressor output pressure, and input manifold pressure. Similarly, when the wastegate 134 opens, each of these pressures will decrease in relation to the amount the wastegate 134 opens and reduces exhaust manifold pressure.

Therefore, it is possible to characterize engine operation at known points such as a low idle point, a rated power point, a highest torque point, a high rpm with 75% load point, or a high rpm with maximum load point, among others, so that the expected values of the respective pressure readings can be predicted. However, when doing diagnostics on sensors, it can be difficult to determine which sensor is actually providing an incorrect reading, particularly if more than one sensor is not accurate, or if all the sensors are slightly off. The wastegate 134 provides a good baseline of pressure because the relatively simple spring bias of the wastegate 134 and the position sensor 214 are not subject to the same high pressures and sometimes high temperatures as the other pressure sensors. Those sensors subject to harsh conditions which benefit most from this diagnostic technique include the exhaust manifold pressure sensor 130 (also known as the turbine input pressure sensor), the turbine output pressure sensor 138, and the EGR delta pressure and absolute pressure sensors. The position of the wastegate 134 in view of the other input conditions of the engine 100 can be used to provide an in-operation check of pressure sensors, particularly these pressure sensors.

For the purpose of illustration, the exhaust manifold pressure sensor (EG) 130, the turbine output (TO) pressure sensor 138, and the IMAP sensor 132 will be discussed. In other embodiments additional sensors can be characterized and diagnosed using the same techniques discussed below. The engine 100 may be characterized at several predetermined operating states, for example, no load at idle, 1800 rpm with maximum torque, or 2000 rpm with moderate torque. At block 282, the engine 100 may be operated in one state, for example, during a bench test or end-of-line test.

Operation of the engine 100 is a function of its inputs, that is, the engine controller 162 develops engine calibration maps based on sensor inputs for certain steady state operation conditions to meet all output requirements including emission requirements. The inputs to the engine controller 162 include throttle angle, throttle angle rate, fuel pressure at the fuel rail 110, injection mode and injection timing, among others. Performance of the engine is a function of not only the inputs from the engine controller, but from other factors such as load, temperature, altitude, etc. Therefore, predicting sensor values is not simply a function of the inputs from the engine controller 162.

At block 284, when the engine is in steady state operation at a predetermined operating state, for example, 1800 rpm with maximum torque, values from each sensor is read. Simultaneously, at block 286, the wastegate position or displacement may be read. The selection of a particular operating state is based in part on its likelihood of recurring during operation of the engine 100 in field operation, creating a measurement window. The measurement window requires that the engine be operating in a steady state and is defined by a selected values for a combination of engine performance characteristics both those measured during operation and those set by the engine controller 162. For example, when the engine 100 runs at 1800 rpm, the controller 162 determines the engine fuel quantity, injection mode, injection pressure and injection timing according to predetermined engine calibration maps to meet machine power requirements. The engine operating range has unlimited points, and the calibration maps are typically developed according to certain calibration points during the engine calibration process. When all engine calibration parameters are close to predetermined calibration points during engine operation in a field (+/−3% within the set value), a measurement window might occur. The controller 162 will combine engine sensor readings to determine whether it is actually a measurement window, since the engine 100 can run at different altitudes and/or different ambient temperatures. If the engine operating boundary conditions are close to ambient pressure and temperature for the calibration process (100±10 KPa, 25±10 deg C.), a measurement window can be safely determined if the engine calibration parameters match the original conditions or a similar selected criteria.

In an embodiment, a calibration point may have the following characteristics: 1800 rpm, 230 $mm^3$ fuel quantity, one shot injection mode, EGR fraction is zero, injection timing is 6 deg before top dead center, pressure is 120 MPa. with ambient air pressure=100 KPa, and ambient temperature (Inlet Air Temp)=25 deg C.

A measurement window for this calibration point may be open when actual operating conditions are 1800 rpm, 231 $mm^3$ fuel quantity fuel, one shot mode, EGR fraction is zero, injection timing is 6 deg before top dead center, and pressure is 122 MPa with the ambient air pressure at =98 KPa, and ambient temperature (Inlet Air Temp)=27 deg C.

At block 288, a regression analysis may be used to characterize a pressure sensor in terms of the wastegate position and the engine values. In general, the relationship takes the form of an equation:

$$\text{Sensor\_}P = f\{\text{wastegate displacement, engine rpm, load, valve timing, rail pressure}\} \quad (1)$$

More specifically, a particular sensor reading such as IMAP during one measurement window may be characterized by defining the constants $C_x$ for the engine values in the equation:

$$\text{IMAP}(1) = C_{1,1} + C_{1,2} * X\_\text{rod} + C_{1,3} * (X\_\text{rod})^2 + C_{1,4} * \text{Eng\_Spd} + C_{1,5} * \text{Eng\_Spd}^2 + C_{1,6} * \text{Fuel} + C_{1,7} * \text{Fuel}^2 + C_{1,8} * \text{Timing} + C_{1,9} * \text{Timing}^2 + C_{1,10} * \text{SOIP} + C_{1,11} * \text{SOIP}^2 \quad (2)$$

where:
X_rod is wastegate displacement,
Fuel is a injected fuel quantity to meet the current load;
Timing is injection timing in terms of crank angle degrees from top dead center (TDC), and
SOIP is Start Of Injection Pressure or fuel rail pressure.

In another example, the compressor output pressure at sensor 132 may be similarly characterized with different constant values for the curve fitting:

$$\text{Comp\_out\_}P(2) = C_{2,1} + C_{2,2} * X\_\text{rod} + C_{2,3} * (X\_\text{rod})^2 + C_{2,4} * \text{Eng\_Spd} + C_{2,5} * \text{Eng\_Spd}^2 + C_{2,6} * \text{Fuel} + C_{2,7} * \text{Fuel}^2 + C_{2,8} * \text{Timing} + C_{2,9} * \text{Timing}^2 + C_{2,10} * \text{SOIP} + C_{2,11} * \text{SOIP}^2 \quad (3)$$

In general then, any pressure value can be characterized for a particular engine state by the general equation:

$$\text{Pressure}(k) = C_{k,1} + C_{k,2} * X\_\text{rod} + C_{k,3} * (X\_\text{rod})^2 + C_{k,4} * \text{Eng\_Spd} + C_{k,5} * \text{Eng\_Spd}^2 + C_{k,6} * \text{Fuel} + C_{k,7} * \text{Fuel}^2 + C_{k,8} * \text{Timing} + C_{k,9} * \text{Timing}^2 + C_{k,10} * \text{SOIP} + C_{k,11} * \text{SOIP}^2 \quad (4)$$

In matrix form:

$$\begin{bmatrix} 1 & c_{1,2} & c_{1,3} & \cdots & c_{1,7} \\ 1 & c_{2,2} & c_{2,3} & \cdots & c_{2,7} \\ 1 & c_{3,2} & c_{3,3} & \cdots & c_{3,7} \\ & & \vdots & & \\ 1 & c_{k,2} & c_{k,3} & \cdots & c_{k,7} \end{bmatrix} \times \begin{bmatrix} \text{Cons} \\ X\_\text{rod}_1 \\ (X\_\text{rod}_1)^2 \\ \vdots \\ \text{SOIP}^2 \end{bmatrix} = \begin{bmatrix} Y_1 \\ Y_2 \\ Y_3 \\ \vdots \\ Y_k \end{bmatrix} \quad (5)$$

Where Y is a particular pressure value.

At block 290, after characterization of the pressure values for a particular operating state are complete, a check can be made if additional states are to be characterized. If so, the 'yes' branch may be taken back to block 282 and the engine operated at a different state. If not, the 'no' branch may be taken to block 292 where the various values may be stored for use in engine operation. There is no need to perform the calculations in real time with the engine calibration or measurement process. The calculations made at block 288 may be performed during engine calibration or end-of-line testing. Because each engine 100 has different physical components and sensors, each with their own tolerances, it is expected that each engine 100 will require separate variable set in end of line testing but in some instances this may not be necessary.

Figure 6:
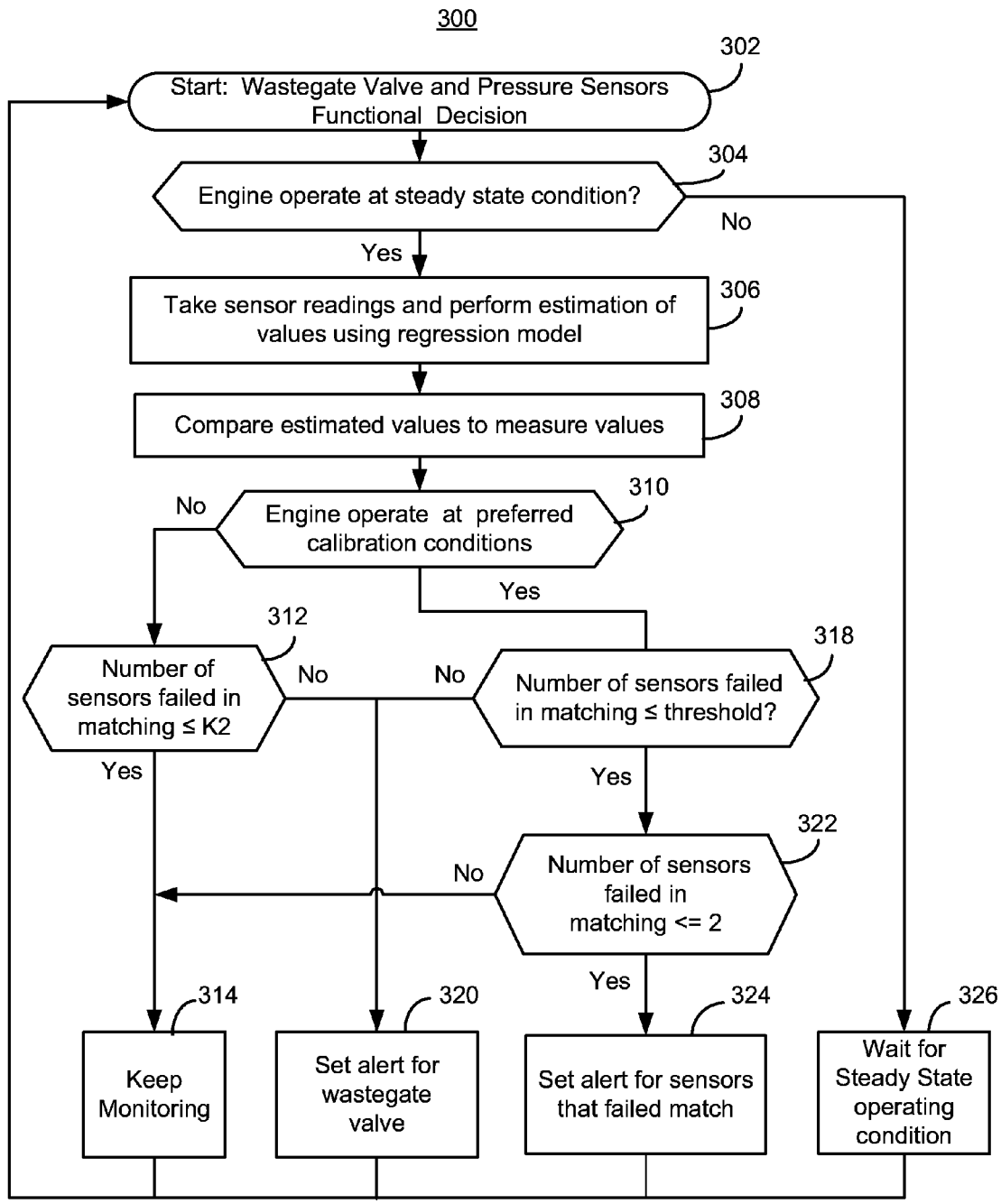
FIG. 6 is a flow chart of a method of performing diagnostic tests for pressure sensors in the engine.

FIG. 6 is a flow chart 300 of a method of performing engine sensor diagnostics using a wastegate position sensor 214. At a block 302, the process begins with the engine 100 operating. The engine may be at idle or may be driving the machine 160 or operating a load such as a tool or generator.

At block 304, a check is made if the engine is operating at a steady state. Operation at a steady state may be defined differently for different engines 100 and for applications in different machines 160 but for the purpose of this discussion, steady state operation is defined as a constant load for 5 minutes or about 5000 revolutions at a nominal engine speed. If operation has not reached a steady state, execution transfers to block 326 and, after a period of time, returns to the restart of the loop at block 302 to check again for steady state operation.

If, at block 304, the engine 100 is operating at a steady state, execution may continue at block 306. At block 306, the values for each sensor, especially the EG pressure sensor 130, the turbine output pressure sensor 138, the IMAP sensor 132, the compressor outlet pressure sensor 144, and the two EGR sensors may be recorded. Other engine parameters from other sensors and engine operating data from the engine controller 162 may be recorded as well.

Also at block 306, the regression models developed as discussed above may be utilized to derive estimated values for each sensor, especially for the three pressure sensors in harsh environments, the EG pressure sensor 130, the turbine output pressure sensor 138, and the IMAP sensor 132.

At block 308, each sensor reading may have its actual value compared to its respective estimated value from the regression model. If the values are within a predetermined range, the comparison passes. If the values are not within the predetermined range, the comparison fails. The predetermined range may be a percentage value, such as 2% or may be an absolute number range, such as ±5 psi (pounds per square inch). The predetermined range may vary by sensor and may even change based on the value itself because some sensors are more accurate at given values, for example, near the center of their measurement range. Both the number of sensors that fail and which sensors fail are recorded.

At block 308, the engine parameters and engine operating data may be compared to those at the preferred calibration conditions to determine if the measurements occurred during a measurement window. If so, the 'yes' branch may be taken to block 318. As discussed above, a measurement window is one in which engine characteristics match those during the calibration process.

At block 318, a number of sensors failed matches is compared to a threshold (K1). In an exemplary embodiment, K1=4. For example, using this embodiment, if two sensors fail, the number of failed sensors is less or equal to the threshold so the 'yes' branch is taken to block 322.

At block 322, the number of failed sensors is less than or equal to two, so the 'yes' branch is taken to block 324 where an alert is set for the two sensors that failed the comparison at block 306. A single failed sensor would follow the same path. The alert may be an indicator light, an alarm, or simply a flag set in the controller 162.

Returning to block 318, if the number of sensors that fails the comparison is greater than the threshold value K1, in this case four, the 'no' branch is taken to block 320 and an alert is set for the wastegate 134. That is, when the values of, in this example, four or more sensors fail the comparison it can be concluded that the wastegate position sensor 214 is providing a bad reading or the wastegate 134 itself is stuck or has otherwise failed. For example, soot or debris may be keeping the piston 206 from seating completely.

Returning to block 322, if the number of sensors is above this second threshold, for example, three, there may not be enough information to make a conclusion and the loop continues through block 314 to block 302 where the cycle repeats.

Returning to block 310, if the engine is not operating at in a measurement window of calibrated values, the 'no' branch may be taken to block 312. Engines are highly non-linear, so that sensor regression models to estimate predicted values are not accurate enough for general inference when the engine is not operating at one of the measurement windows with calibrated data. Therefore, less information can be inferred from failed matches when the engine is operating outside one of the calibrated conditions.

At block 312, the number of sensors failing the comparison may compared to the threshold K2, which may or may not be the same as K1. If the number of failed sensors is greater than K2, the 'no' branch may be taken to block 320 and an alert may be set for the wastegate 134. K2 may be set based on characteristics of the individual engine model and/or the machine 160 in which the engine 100 is installed. In various embodiments, K2 may be 4 or 5.

If, at block 312, the number of sensors that fail the comparison is less than or equal to the K2 threshold, no alerts are set and execution of the loop proceeds through block 314 and back to block 302.

An additional benefit of the techniques described comes through storing wastegate position value vs. actuating pressure over time. Valve fatigue can be predicted by looking for a shift in the relationship of wastegate position and pressure over a long period to time. The techniques described above can also be used in closed loop wastegate control with the shaft position as an input for a control loop calculation.

The ability to monitor and diagnose pressure sensor failures based on a simple regression model using engine data and wastegate position offers an elegant and simple way to look for failed sensors. In addition, the same model allows diagnosis of failures of the wastegate 134. Calibration of the wastegate may be performed with a simple hand pump and hand tools compared to operational calibration of more complex sensors in harsh environments such as exhaust manifold pressure sensors 130.

What is claimed is:

1. A method of performing sensor diagnostics in an engine, the method comprising:
   defining a measurement window for performing sensor diagnostics, the measurement window occurring when a plurality of engine conditions fall within respective value ranges;
   identifying the measurement window during operation of the engine;
   collecting wastegate position data and sensor data within the measurement window; and
   performing a diagnostic test using the sensor data collected within the measurement window, the diagnostic test including:
      determining a predicted output value for a first sensor as a function of wastegate position; and
      comparing an actual value of the first sensor taken during the measurement window and the predicted output value; and
      when the predicted output value and the actual value fail to meet a matching criterion, setting an alert indicating a probably failure in the first sensor.

2. The method of claim 1, wherein performing the diagnostic test further comprises:
   within the measurement window, collecting additional output values for each of a plurality of sensors;
   determining additional predicted values for each of the plurality of sensors, each of the additional predicted values being a function of the wastegate position;
   comparing the additional output values for each of the plurality of sensors to the corresponding additional predicted values for each of the plurality of sensors;
   when a number of sensors that fail to meet their respective matching criteria exceeds a threshold value, setting a wastegate alert indicating a problem with the wastegate.

3. The method of claim 2, further comprising:
   when the number of sensors that fail to meet their respective matching criteria is less than or equal to the threshold value, setting a respective additional alert for each of the plurality of sensors that fails to meet its respective matching criterion.

4. The method of claim 2, further comprising:
   collecting non-window wastegate position data and non-window sensor data taken outside the measurement window;
   determining predicted non-window values for each of the plurality of sensors, each of the predicted non-window values being a function of the wastegate position;
   comparing the measured non-window output value for each of the plurality of sensors to the predicted non-window values for the corresponding each of the plurality of sensors; and
   when a number of sensors that fail to meet their respective matching criteria exceeds a second threshold value, setting the alert indicating a problem with the wastegate.

5. The method of claim 1, wherein defining the measurement window for performing sensor diagnostics comprises:
   defining a respective value range for each of a plurality of engine operating parameters, the engine operating parameters including one or more of engine rpm, engine fuel consumption and engine fuel valve opening timing.

6. The method of claim 1, wherein defining the measurement window comprises requiring the measurement window occurs during steady state operation of the engine.

7. The method of claim 1, wherein defining the measurement window comprises selecting values for a combination of engine performance characteristics including engine operating parameters and engine input data developed at an engine controller coupled to the engine.

8. The method of claim 7, wherein the engine operating parameters include one or more of engine speed, throttle condition, and engine load and wherein the engine input data includes one or more of injection shot mode, injection timing, fuel pressure, and fuel quantity.

9. The method of claim 1, further comprising:
   monitoring over a predetermined time a relationship of intake manifold pressure vs. wastegate position; and
   setting a wastegate alarm when a value of intake manifold pressure vs. wastegate position changes beyond a predetermined limit.

10. The method of claim 1, wherein collecting wastegate position data comprises using a Hall-effect sensor to report a position of a shaft coupled to a low-pressure side of a wastegate valve.

11. The method of claim 1, wherein the measurement window occurs when a different plurality of engine parameters and engine operating data fall within respective predefined ranges.

12. The method of claim 1, wherein the first sensor is one of a intake manifold air pressure (IMAP) sensor, a turbocharger compressor-out pressure sensor, and a turbocharger input pressure.

13. The method of claim 1, wherein determining a predicted output value of the first sensor includes solving an algorithm that includes wastegate position, one or more engine operating data, and one or more engine parameters each multiplied by respective constant values determined empirically during engine calibration.

14. A system for performing a sensor diagnostic test in an engine comprising:
   a wastegate having a wastegate position sensor that reports a displacement of the wastegate;
   a sensor being evaluated by the sensor diagnostic test, the sensor configured to report a value of an engine parameter;
   an engine controller coupled to the engine, the sensor, and the wastegate position sensor, the engine controller executing stored instructions that cause the engine controller to perform the sensor diagnostic test including:
      analyzing at least the displacement of the wastegate to determine a predicted output value of the sensor; and
      setting an alert indicating a failure in the sensor when the predicted output value of the sensor is outside a predetermined range of the value reported by the sensor.

15. The system of claim 14, further comprising:
   a plurality of additional sensors coupled to the engine controller that each report respective values of additional engine parameters; and
   engine operating data developed at the engine controller, wherein analyzing at least the displacement of the wastegate to determine a predicted output value of the sensor further includes analyzing the engine operating data and the additional engine parameters to determine the predicted value of the sensor.

16. The system of claim 15, wherein the engine controller executes additional stored instructions for:
   determining a predicted output value a plurality of additional sensors;
   comparing the predicted output value of the plurality of additional sensors to corresponding values provided by the respective plurality of additional sensors;
   when less than or equal to a threshold number of the plurality of additional sensors fail the comparison, setting individual alerts for each sensor that fails the comparison;
   when more than the threshold number of the plurality of sensors fail the comparison, setting a wastegate alert indicating a potential failure of the wastegate.

17. The system of claim 15, wherein the engine controller executes additional stored instructions including:
   monitoring the engine parameters and the engine operating data to determine a measurement window that matches select engine parameters and select engine operating data corresponding to engine calibration test points; and
   performing the sensor diagnostic test during the measurement window.

18. A method of performing a sensor diagnostic test for an engine, the method comprising:
   collecting data from a plurality of sensors including a wastegate position sensor that reports a position of a wastegate;
   determining a measurement window by analyzing the collected data; and
   analyzing the collected data read during the measurement window to develop a predicted value of a first sensor based at least in part on the wastegate position; and
   setting an alert for a failure of the first sensor when the predicted value of the first sensor and an actual value reported by the first sensor fail to meet a matching criterion.

19. The method of claim 18, further comprising:
   analyzing the collected data read during the measurement window to predict values of two or more additional sensors of the plurality of sensors; and
   when a number of two or more additional sensors that fail to match predicted values and actual reported values is below a threshold number, setting additional alerts for a failure of each sensor that fails the match.

20. The method of claim 19, further comprising:
   when a number of the two or more additional sensors that fail to match predicted values and actual reported values is equal to or greater than the threshold number, setting a wastegate alert for a failure of the wastegate.

* * * * *